United States Patent
Wang

(10) Patent No.: US 8,686,717 B2
(45) Date of Patent: Apr. 1, 2014

(54) POSITION SENSOR ARRANGEMENT

(75) Inventor: Orson S. Wang, Livonia, MI (US)

(73) Assignee: GM Global Technology Operations LLC, Detroit, MI (US)

(*) Notice: Subject to any disclaimer, the term of this patent is extended or adjusted under 35 U.S.C. 154(b) by 832 days.

(21) Appl. No.: 12/205,991

(22) Filed: Sep. 8, 2008

(65) Prior Publication Data

US 2010/0060577 A1    Mar. 11, 2010

(51) Int. Cl.
*G01B 7/14* (2006.01)

(52) U.S. Cl.
USPC ............... 324/207.24; 74/473.12; 74/473.18; 701/52; 701/53; 324/207.11; 324/251; 324/252; 324/12

(58) Field of Classification Search
USPC ....................... 74/473.12, 473.18; 701/52, 53; 324/207.24
See application file for complete search history.

(56) References Cited

U.S. PATENT DOCUMENTS

| | | | | |
|---|---|---|---|---|
| 4,459,578 A * | 7/1984 | Sava et al. | | 338/128 |
| 5,160,918 A * | 11/1992 | Saposnik et al. | | 345/161 |
| 5,168,221 A * | 12/1992 | Houston | | 324/207.13 |
| 5,852,953 A * | 12/1998 | Ersoy | | 74/473.12 |
| 6,674,280 B1 * | 1/2004 | Goetz et al. | | 324/207.21 |
| 6,707,293 B2 * | 3/2004 | Wan et al. | | 324/207.25 |
| 7,757,579 B2 * | 7/2010 | Bloch | | 74/471 XY |
| 8,054,291 B2 * | 11/2011 | Takatsuka | | 345/157 |
| 8,222,889 B2 * | 7/2012 | Oberhoffner | | 324/207.13 |
| 2002/0067162 A1 * | 6/2002 | Dammkohler et al. | | 324/207.21 |
| 2006/0207310 A1 * | 9/2006 | Kuwata et al. | | 73/1.37 |
| 2006/0213707 A1 * | 9/2006 | Heinen | | 180/65.5 |
| 2006/0274040 A1 * | 12/2006 | Passaro et al. | | 345/161 |
| 2009/0012740 A1 * | 1/2009 | Hain et al. | | 702/148 |

* cited by examiner

*Primary Examiner* — Jermele M Hollington
*Assistant Examiner* — Temilade S Rhodes-Vivour
(74) *Attorney, Agent, or Firm* — Lionel D. Anderson; Reising Ethington P.C.

(57) ABSTRACT

A position sensor arrangement that can determine the two-dimensional position of a variety of different movable devices, such as an electronic joystick. According to one embodiment, the position sensor arrangement includes two pair of magnetic sensing elements that are angularly offset or skewed with respect to one another in order to provide redundancy and accuracy with a minimum number of sensing elements.

18 Claims, 2 Drawing Sheets

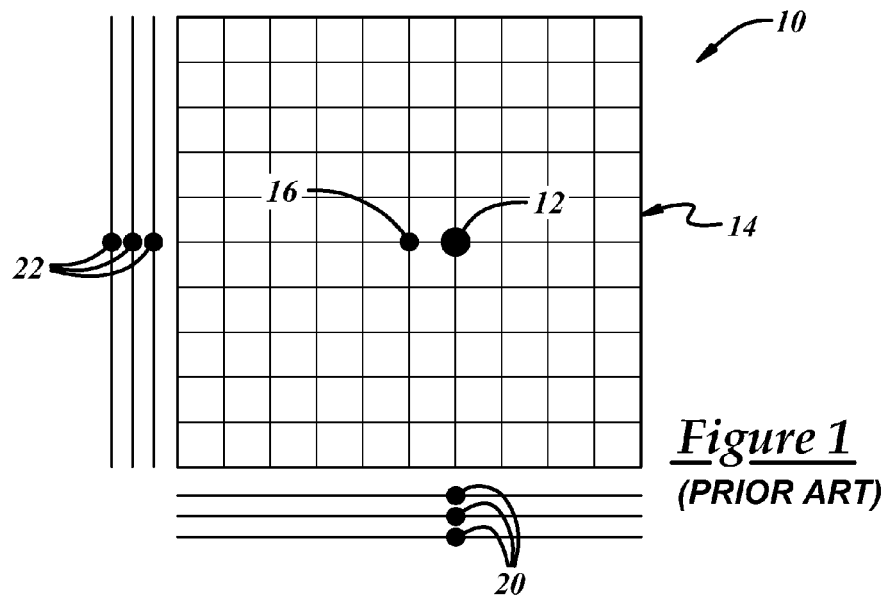
*Figure 1*
(PRIOR ART)
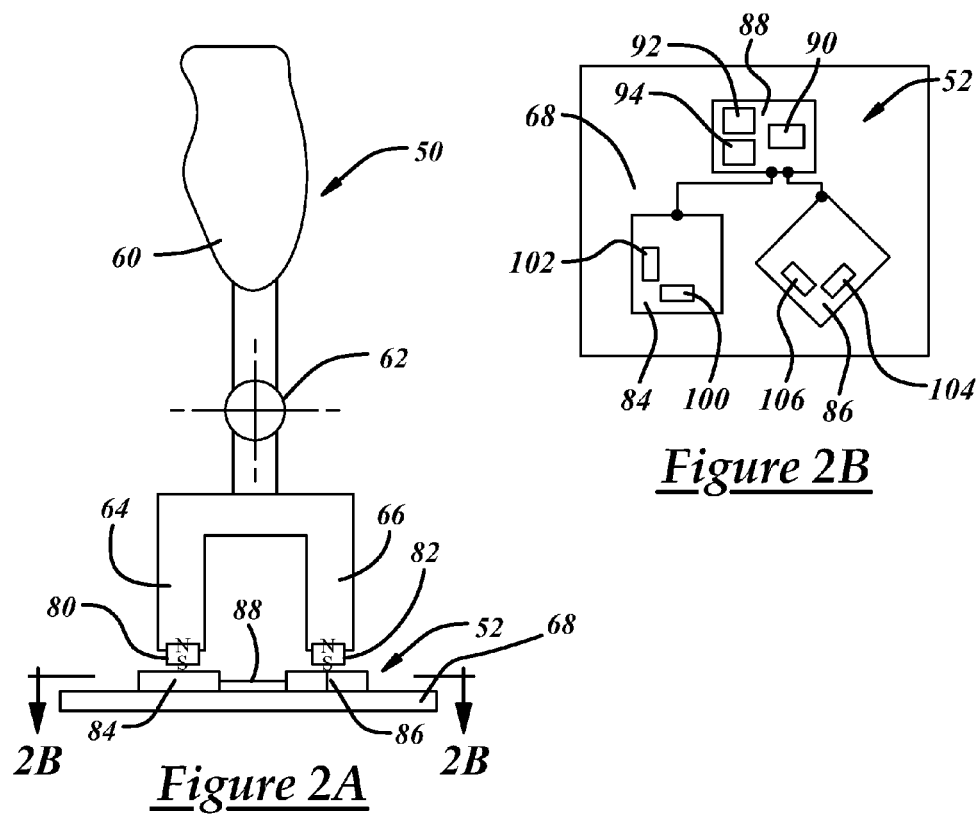
*Figure 2A*
*Figure 2B*

POSITION SENSOR ARRANGEMENT

TECHNICAL FIELD

The present invention generally relates to position sensors and, more particularly, to a position sensor arrangement that can determine the location of a movable device, such as a joystick.

BACKGROUND OF THE INVENTION

Various types of position sensors have been used to determine the rotational, linear, and planar positions of a movable device. Some applications require a certain level of redundancy or dependability; in such cases, multiple position sensors can be used to detect a single position coordinate for the movable device.

For example, in an application where a device moves in two dimensions, multiple x-axis sensors could be used to redundantly determine the device's x-axis position and multiple y-axis sensors could be used to redundantly determine its y-axis coordinate. This type of position sensing arrangement may satisfy the redundancy requirements of the system, however, the use of numerous position sensors can increase the cost and complexity of the system.

SUMMARY OF THE INVENTION

According to one aspect, there is provided a position sensor arrangement that comprises first and second pairs of sensing elements. The first pair of sensing elements sense the two-dimensional position of a movable device relative to a first sensing grid, the second pair of sensing elements sense the two-dimensional position of the movable device relative to a second sensing grid, and the first and second sensing grids are offset with respect to one another.

According to another aspect, there is provided a position sensor arrangement that comprises one or more movable sensor component(s) mounted to an electronic joystick, and first and second stationary sensor components mounted to a circuit board. The first and second stationary sensor components are skewed on the circuit board with respect to one another.

BRIEF DESCRIPTION OF THE DRAWINGS

Preferred exemplary embodiments of the invention will hereinafter be described in conjunction with the appended drawings, wherein like designations denote like elements, and wherein:

FIG. 1 is a schematic view of a conventional two-dimensional sensing grid having three x-axis sensors and three y-axis sensors;

FIG. 2A is a side view of an exemplary joystick and position sensor arrangement, where the exemplary position sensor arrangement includes several movable sensor components mounted to the joystick and several stationary sensor components mounted to a printed circuit board;

FIG. 2B is a top schematic view of the exemplary printed circuit board and stationary sensor components of FIG. 2A;

DETAILED DESCRIPTION OF THE PREFERRED EMBODIMENTS

Figure 3:
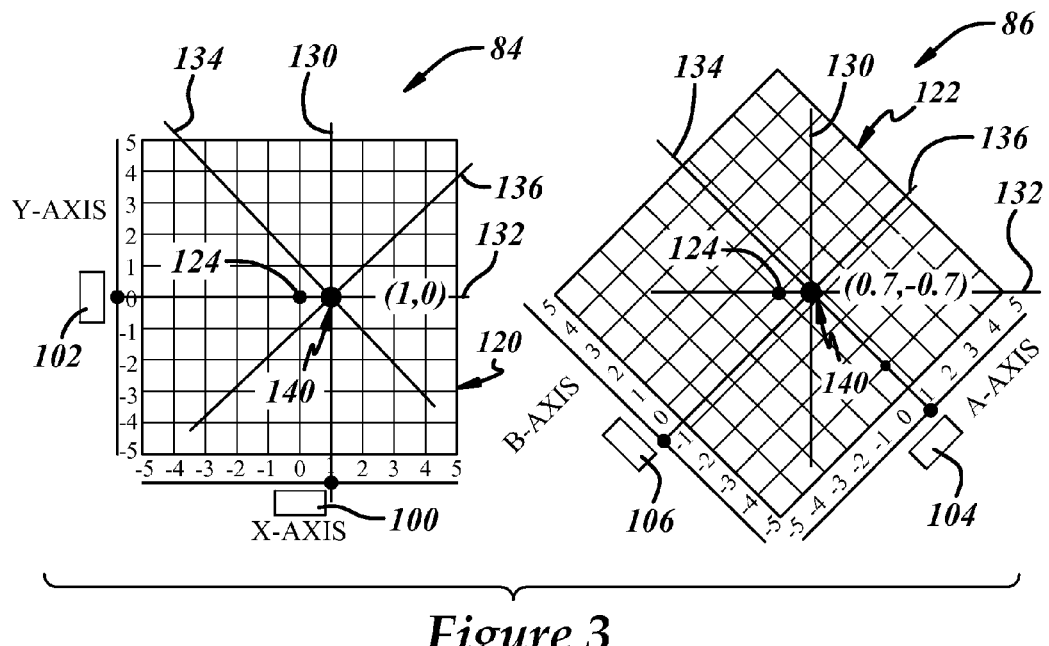
FIG. 3 is a schematic view of exemplary two-dimensional sensing grids that may be associated with the stationary sensor components of FIG. 2A, where all of the sensing elements are functioning properly.

The position sensor arrangement described herein can determine the position of a variety of different movable devices including, but certainly not limited to, electronic joysticks. As an example, the position sensor arrangement may be used with an electronic joystick for a vehicle electronic transmission range select (ETRS) device, an electronic joystick for a vehicle drive-by-wire application, or any other vehicle or non-vehicle application where it is desirable to sense the two-dimensional position of a movable device. The term 'joystick' broadly includes any joystick, lever, control, or other user input device that can move in at least two dimensions or degrees of freedom. Although joysticks are particularly well suited for use with the position sensor arrangement described below, they are not the only applications where the invention may be used.

With reference to FIG. 1, there is shown a schematic illustration of a conventional position sensor arrangement 10 that uses three sensors per axis to determine the two-dimensional position of a movable device 12. This two-dimensional position is based on a single sensing grid 14 having an origin 16. According to this example, position sensor arrangement 10 uses three position sensors 20 to redundantly determine the x-axis position of movable device 12 and three position sensors 22 to redundantly determine its y-axis position. Because of the nature of certain movable devices, such as electronic gear shifters, sensor multiplicity or redundancy may be a requirement.

To illustrate, assume that only a single y-axis position sensor 22 is used and that sensor has a malfunction which causes it to provide an inaccurate y-axis coordinate. Not only would the system be unable to accurately identify the true position of movable device 12, it may not even be aware that an error has occurred. Now assume that conventional position sensor arrangement 10 utilizes two position sensors per axis and that there is a malfunction with, for example, one of the y-axis sensors 22. The system would be alerted that there is an error because the two y-axis sensors would provide different readings, however, the system may not be able to determine which sensor has malfunctioned. This explains why some conventional position sensor arrangements, such as the one shown in FIG. 1, use three position sensors per axis. Such systems can employ a 'two-of-three' voting strategy that not only detects a sensor malfunction, but also identifies which sensor is bad. Although these types of position sensor arrangements can provide acceptable redundancy and dependability, the additional sensors can increase the expense and complexity of the sensor arrangement.

Turning now to FIGS. 2A and 2B, there is shown an exemplary embodiment of an electronic joystick 50 and a position sensor arrangement 52 that determines the joystick position. In this particular embodiment, an operator can engage a handle portion 60 of the joystick and manipulate its position by pivoting the joystick about a pivot point 62 so that a pair of legs 64, 66 sweep over a two-dimensional plane that is generally coincident with printed circuit board (PCB) 68. Depending on the particular application, electronic joystick 50 may be confined to travel within a predetermined pattern (e.g., a shift pattern) or it may be free to move about without the constraint of a set configuration. Legs 64, 66 each carry sensor components so that their position, and hence the position of electronic joystick 50, can be determined. The electronic joystick design illustrated here is only exemplary in nature, as the present position sensor arrangement could be used with a variety of different movable devices and is not limited to use with this particular design.

Position sensor arrangement 52 is suitable for use with any movable device capable of traveling in two dimensions or degrees of freedom. According to the exemplary embodiment shown here, the position sensor arrangement includes first and second movable sensor components 80, 82, first and second stationary sensor components 84, 86, and an electronic processing device 88. Although the following description is in the context of a two-dimensional, magnetic-type position sensor, it should be appreciated that other types of position sensors may be used. This includes mechanical-type and optical-type position sensors, for example.

Movable sensor components 80, 82 are mounted to the movable object, in this case the legs of electronic joystick 52, and are proximate stationary sensor components 84, 86. In this particular embodiment, movable sensor components 80, 82 each includes a disk-shaped permanent magnet that is attached to the end of a joystick leg so that a north pole of the magnet faces upwards and a south pole faces downwards (see FIG. 2A). If electronic joystick 52 is pivotally engaged, movable sensor components 80, 82 move in unison and experience a corresponding displacement that affects the surrounding magnetic field. Changes to the magnetic can be sensed by stationary sensor components 84, 86, as is understood by those skilled in the art. The embodiment shown in the drawings is, again, only an exemplary arrangement. Movable sensor components 80, 82 may instead: be mounted to different parts of the joystick legs, be mounted to a separate component that travels in unison with the joystick, be combined into a single magnet that interacts with both stationary sensor components 84, 86, include permanent magnets having a different shape and/or pole arrangement, and include elements other than permanent magnets, to cite a few possibilities.

Stationary sensor components 84, 86 are preferably mounted in close proximity to movable sensor components 80, 82, respectively, in order to sense changes in the resultant magnetic field and to provide a sensor output that is representative thereof. In an exemplary embodiment, each of the stationary sensor components 84, 86 is an integrated electronic component that includes two separate sensing elements (one for each dimension or degree of freedom in which electronic joystick 50 can move) and is mounted to PCB 68. Sensing elements 100, 104 provide x- and a-axis positions for sensing grids 120, 122, respectively, and sensing elements 102, 106 provide y- and b-axis positions for sensing grids 120, 122, respectively. The terms x-, y-, a- and b-axis positions are used here for purposes of illustration, but any suitable axes and/or coordinate system could be used. In a different embodiment, sensing elements 100-106 could be packaged differently; that is, they do not have to be integrated into first and second stationary sensor components 84, 86 in the manner described above. For example, each sensing element 100-106 could be individually packaged and mounted to circuit board 68, or all of the sensing elements 100-106 could be included within a single integrated component.

A variety of different sensor types could be used in stationary sensor components 84, 86, so long as they are able to discern changes in the position of a movable device. As mentioned above, pivotal movement of electronic joystick 50 causes changes in the magnetic field that is created by the permanent magnets in movable sensor components 80, 82. Examples of devices that could be used for sensing elements 100-106 include Hall effect devices that provide output based on sensed magnetic field intensity and magnetoresistive (MR) devices that provide output based on sensed magnetic field direction, to name a few. These are only two possibilities, as other types of magnetic, mechanical and optical sensing devices could be used as well. An example of a suitable stationary sensor element is the Melexis MLX90333, which is a three-dimensional position sensor.

With reference to FIG. 3, stationary sensor component 84 has individual sensing elements 100, 102 that determine the position of movable sensor component 80 (in this case, a magnet) relative to x- and y-axes of a first sensing grid 120. Likewise, stationary sensor component 86 has individual sensing elements 104, 106 that sense the a- and b-axis positions of movable sensor element 82 on a second sensing grid 122. This results in a total of four sensing elements that together produce two pairs of coordinates or readings. It should be appreciated from the drawings that sensing grids 120 and 122 are offset or skewed, with respect to one another. In this particular example, the axes of each sensing grid are perpendicular to one another, and sensing grids 120 and 122 are angularly offset by 45°, however, they could be offset by other angles or arranged according to other orientations.

Electronic processing device 88 is electronically coupled to stationary sensor components 84, 86 and may receive sensor output for signal processing and analytical purposes. According to one embodiment, electronic processing device 88 includes a processing unit 90 for executing electronic instructions, a read only memory (ROM) unit 92 for storing executable instructions and the like, a random access memory (RAM) unit 94 for storing sensor readings, variables and other dynamic information, as well as any other suitable components known to those skilled in the art. It should be appreciated that electronic processing device 88 can be an analog or a digital device, it can be a dedicated processing device (e.g., one that only services position sensor arrangement 52) or a shared processing device, and it can be a stand alone device (e.g., one that is independently mounted to PCB 68) or part of a larger system like a vehicle electronic module, to cite several possibilities.

In one alternative arrangement, first and second stationary sensor components 84, 86 and electronic processing device 88 are all packaged within a single integrated circuit that can be mounted to printed circuit board 68 or attached via some other means, such as by a lead frame. In another alternative arrangement, the permanent magnets and the sensing elements are switched so that the magnets are stationarily mounted within position sensor arrangement 52 and the sensing elements are movably attached to the ends of joystick legs 64, 66. These are, of course, only two possible alternatives, as other embodiments could be used as well.

In operation, position sensor arrangement 52 uses readings from sensing elements 100-106 to determine the two-dimensional position of a movable device, like electronic joystick 50. Because of the offset or skewed nature of first and second stationary sensor components 84, 86 and their respective sensing grids 120, 122, position sensor arrangement 52 is able to detect a sensor malfunction and, if one is detected, identify the faulty sensing element. Moreover, position sensor arrangement 52 is able to accomplish this with as little as four sensing elements, where some conventional position sensor arrangements require at least six sensing elements.

First, sensor readings are obtained from sensing elements 100-106. With reference to the example illustrated in FIG. 3, sensing element 100 reports an x-axis position of '1' and sensing element 102 reports a y-axis position of '0'; thus, first stationary sensor component 84 provides electronic processing device 88 with the coordinates (1, 0), relative to first sensing grid 120. Sensing element 104 outputs an a-axis position of '0.7' and sensing element 106 outputs a b-axis position of '−0.7'; this results in stationary sensor component 86 sending electronic processing device 88 the coordinates (0.7, −0.7), relative to second sensing grid 122. It should be appreciated that while the coordinates are described here in terms of standard Cartesian coordinates, other coordinates and coordinate systems could also be used.

If the transformed coordinates line up, as they do in the example of FIG. 3, then position sensor arrangement 52 determines that it is a valid reading. To demonstrate, refer to lines 130-136 which have been drawn for the four coordinate readings provided by the four sensing elements 100-106 (coordinate readings from sensing grid 122 have been mapped on sensing grid 120 and vice-versa for purposes of illustration). Line 130 represents the coordinate reading from sensing element 100 (x=1), line 132 represents the coordinate reading from sensing element 102 (y=0), line 134 represents the coordinate reading from sensing element 104 (a=0.7), and line 136 represents the coordinate reading from sensing element 106 (b=−0.7; notice lines 134, 136 have been mapped onto grid 120 from grid 122). All four lines converge at point 140 which coincides with the actual position of electronic joystick 52. Because of the convergence at a single point, position sensor arrangement 52 can be confident that all of the sensing elements are outputting accurate readings. Of course, lines 130-136 are simply meant to illustrate the mapping of the two different sensing grids; skilled artisans will appreciate that trigometric and other mathematical algorithms could be used to perform this function.

For example, the following transform may be used to map coordinates from one sensing grid to the other, where coordinates from sensing grid 120 are represented as (x, y), coordinates from sensing grid 122 are represented as (a, b), the angle separating the x- and a-axes is α (45° in this example), and the angle separating the x- and the b-axes is β (135° in this example).

$$\begin{bmatrix} \cos(\alpha) & \sin(\alpha) \\ \cos(\beta) & \sin(\beta) \end{bmatrix} \begin{bmatrix} x \\ y \end{bmatrix} = \begin{bmatrix} a \\ b \end{bmatrix} \quad \text{(Equation 1)}$$

$$a = x * \cos(\alpha) + y * \sin(\alpha) \quad \text{(algebraic form)}$$
$$b = x * \cos(\beta) + y * \sin(\beta)$$

In an exemplary embodiment, coordinates (x, y) are mapped onto sensing grid 122 to produce coordinates (a', b') and coordinates (a, b) are mapped onto sensing grid 120 to produce coordinates (x', y'), thus, resulting in four sets of coordinates. If one set of equivalent coordinates is unequal while the remaining sets of equivalent coordinates are equal, then it can be determined that the corresponding sensing element has malfunctioned. For instance, if (b≠b'), but (a=a'), (x=x') and (y=y'), then position sensor arrangement 52 can determine that sensing element 106 producing coordinate 'b' has malfunctioned. Depending on the application, the operand '=' may signify similarity within a certain range; e.g., the coordinates need to be within 3% or some other tolerance of each other, as opposed to an exact equality.

Figure 4:
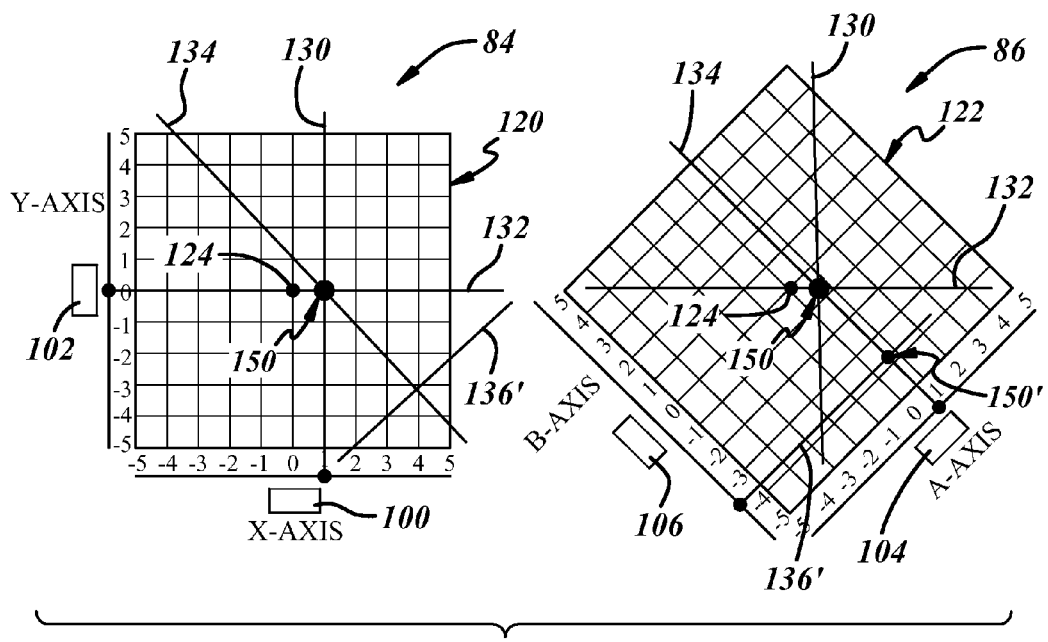
FIG. 4 is a schematic view of the exemplary two-dimensional sensing grids from FIG. 3, where one of the sensing elements is malfunctioning.

Now, consider the example shown in FIG. 4 where one of the sensing elements, in this case sensing element 106, malfunctions and outputs an inaccurate reading. Assume that sensing elements 100, 102 report an accurate position of (1, 0), as before, but sensing elements 104, 106 report an inaccurate reading of (0.7, −3.7); this is shown in FIG. 4 as incorrect reading 150'. Put differently, sensing element 106 incorrectly outputs a b-axis position of −3.7 when it should be sending a reading of −0.7. If lines are drawn to represent these readings, then three of the lines 130-134 converge at a single point 150 corresponding to the actual position of the electronic joystick, while line 136' does not. It is clear from the graphical representation in FIG. 4, that line 136' and hence the reading from sensor element 106 is the outlier of the group. Electronic processing device 88 may then determine that the position corresponding to point 150 is representative of the actual position of electronic joystick 50, and that sensing element 106 has malfunctioned.

In some cases, this determination is made easier if the malfunctioning sensing element outputs a reading that is outside of an allowed range. For instance, in the example described above if sensing element 106 were to output a y-axis position of −10, then electronic processing device 88 may know immediately that this value is beyond the range of acceptable values and is therefore not allowed. Various combinations of steps, checks, techniques, etc. could be used to determine the validity or accuracy of the sensor readings.

By orienting sensing elements 100-106 in the described manner, first and second sensing grids 120, 122 become skewed or offset, with respect to one another. This typically causes corresponding sensing elements to provide different sensor readings for the movable object. Put differently, when electronic joystick 50 is in a non-origin position, the x-axis sensing element 100 may provide a different reading than the a-axis sensing element 104; the same is true for the y-axis and b-axis sensing elements 102, 106. This type of sensor independence enables position sensor assembly 52 to detect a sensing element failure, identify the malfunctioning sensing element, and determine the correct position of electronic joystick 50—all with only a few number of sensing elements. If one of the exemplary sensing elements 100-106 malfunctions, position sensor arrangement 52 can still operate; a so-called limp-home capability. Exemplary position sensor arrangement 52 can provide this while only using a total of four sensing elements, while the conventional position sensor arrangement shown in FIG. 1 uses a total of six sensing elements.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:
1. A position sensor arrangement, comprising:
   a first pair of sensing elements that sense the two-dimensional position of a movable device relative to a first sensing grid, one of the first pair of sensing elements is arranged to provide one of the two dimensions and the other of the first pair of sensing elements is arranged to provide the other of the two dimensions; and a second pair of sensing elements that sense the two-dimensional position of the movable device relative to a second sensing grid, one of the second pair of sensing elements is arranged to provide one of the two dimensions and the other of the second pair of sensing elements is arranged to provide the other of the two dimensions, wherein the first and second pairs of sensing elements are mounted according to an angular offset with respect to one another so that the first and second pairs of sensing elements do not share the same axes and so that the position sensor arrangement can determine the two-dimensional position of the movable device.

2. The position sensor arrangement of claim 1, wherein the movable device is an electronic joystick and the position sensor arrangement further comprises first and second movable sensor components mounted to the joystick so that they are proximate the first and second pairs of sensing elements, respectively.

3. The position sensor arrangement of claim 2, wherein the first movable sensor component includes a permanent magnet mounted to a first joystick leg so that it is proximate the first pair of sensing elements, the second movable sensor element includes a permanent magnet mounted to a second joystick leg so that it is proximate the second pair of sensing elements, and the first and second joystick legs move in unison.

4. The position sensor arrangement of claim 2, wherein the electronic joystick is part of a vehicle electronic transmission range select (ETRS) device.

5. The position sensor arrangement of claim 2, wherein the electronic joystick is part of a vehicle drive-by-wire device.

6. The position sensor arrangement of claim 1, wherein each of the first and second pairs of sensing elements includes a Hall effect device.

7. The position sensor arrangement of claim 1, wherein each of the first and second pairs of sensing elements is mounted to a common printed circuit board (PCB).

8. The position sensor arrangement of claim 1, further comprising an electronic processing device that is electronically coupled to the first and second pairs of sensing elements and maps the coordinates from the first sensing grid onto the second sensing grid and vice-versa.

9. A position sensor arrangement, comprising:
a first pair of sensing elements that sense the two-dimensional position of a movable device relative to a first sensing grid, one of the first pair of sensing elements is arranged to provide one of the two dimensions and the other of the first pair of sensing elements is arranged to provide the other of the two dimensions; and
a second pair of sensing elements that sense the two-dimensional position of the movable device relative to a second sensing grid, one of the second pair of sensing elements is arranged to provide one of the two dimensions and the other of the second pair of sensing elements is arranged to provide the other of the two dimensions;
wherein the first and second pairs of sensing elements are mounted according to an angular offset with respect to one another so that the first and second pairs of sensing elements do not share the same axes, so that the position sensor arrangement can determine the two-dimensional position of the movable device, and so that the position sensor arrangement can detect a sensing element failure, identify the malfunctioning sensing element, and determine the correct position of the movable device without using any additional sensing elements.

10. A position sensor arrangement, comprising:
a first pair of sensing elements that sense the two-dimensional position of a movable device relative to a first sensing grid, one of the first pair of sensing elements is arranged to provide one of the two dimensions and the other of the first pair of sensing elements is arranged to provide the other of the two dimensions; and
a second pair of sensing elements that sense the two-dimensional position of the movable device relative to a second sensing grid, one of the second pair of sensing elements is arranged to provide one of the two dimensions and the other of the second pair of sensing elements is arranged to provide the other of the two dimensions, wherein the first and second sensing grids are offset by 45° with respect to one another.

11. A position sensor arrangement, comprising:
one or more movable sensor component(s) mounted to an electronic joystick; and
first and second stationary sensor components mounted to a circuit board so that they are proximate the movable sensor component(s), wherein the first and second stationary sensor components are mounted to the circuit board according to orientations that are angularly skewed with respect to one another so that the angularly skewed orientation of the first and second stationary sensor components enables the position sensor arrangement to detect a failure with a sensor component, to identify which sensor component is malfunctioning, and to determine the correct position of the movable device without using any additional sensor components.

12. The position sensor arrangement of claim 11, wherein a first movable sensor component includes a permanent magnet and is mounted to a first leg of the electronic joystick, a second movable sensor element includes a permanent magnet and is mounted to a second leg of the electronic joystick, and the first and second joystick legs move in unison.

13. The position sensor arrangement of claim 11, wherein the electronic joystick is part of a vehicle electronic transmission range select (ETRS) device.

14. The position sensor arrangement of claim 11, wherein the electronic joystick is part of a vehicle drive-by-wire device.

15. The position sensor arrangement of claim 11, wherein each of the first and second stationary sensor components includes a Hall effect device.

16. The position sensor arrangement of claim 11, wherein the first and second stationary sensor components are mounted to a common printed circuit board (PCB).

17. A position sensor arrangement, comprising:
first and second movable sensor components mounted to an electronic joystick; and
first and second stationary sensor components mounted to a circuit board so that they are proximate the first and second movable sensor components, respectively, and the first and second stationary sensor components are skewed on the circuit board with respect to one another;
wherein the first stationary sensor component interacts with the first movable sensor component and senses the two-dimensional position of the electronic joystick relative to a first sensing grid, the second stationary sensor component interacts with the second movable sensor component and senses the two-dimensional position of the electronic joystick relative to a second sensing grid, and the first and second sensing grids are offset by 45° with respect to one another.

18. The position sensor arrangement of claim 17, further comprising an electronic processing device that is electronically coupled to the first and second stationary sensor components and maps the coordinates from the first sensing grid onto the second sensing grid and vice-versa.

\* \* \* \* \*